US010627546B2

(12) United States Patent
Magnan et al.

(10) Patent No.: US 10,627,546 B2
(45) Date of Patent: Apr. 21, 2020

(54) METHOD AND SYSTEM FOR LIGHTNING DETECTION

(71) Applicant: Current Lighting Solutions, LLC, East Cleveland, OH (US)

(72) Inventors: Sebastien Magnan, Lachine (CA); Gleb Geguine, Lachine (CA)

(73) Assignee: Current Lighting Solutions, LLC, East Cleveland, OH (US)

( * ) Notice: Subject to any disclaimer, the term of this patent is extended or adjusted under 35 U.S.C. 154(b) by 108 days.

(21) Appl. No.: 15/368,712

(22) Filed: Dec. 5, 2016

(65) Prior Publication Data
US 2018/0156941 A1   Jun. 7, 2018

(51) Int. Cl.
*G01W 1/16* (2006.01)
(52) U.S. Cl.
CPC .................................. *G01W 1/16* (2013.01)
(58) Field of Classification Search
CPC ......... G01W 1/16; G01W 1/06; H02J 7/0068; H02J 9/065; G01R 31/385; G01R 33/02; F03D 80/30; G01J 1/04
USPC ......... 324/72, 72.5, 244.1, 76.33, 76.19, 97, 324/460, 500, 506, 542, 556; 250/227.11, 250/353, 504 R, 216; 356/73.1
See application file for complete search history.

(56) References Cited

U.S. PATENT DOCUMENTS

| 6,552,521 | B1 | 4/2003 | Medelius et al. |
| 8,600,678 | B2 | 12/2013 | Kelly et al. |
| 2008/0017788 | A1* | 1/2008 | Kraemer ............... G01W 1/16 250/227.11 |
| 2008/0122424 | A1* | 5/2008 | Zhang ............... G01R 29/0842 324/72 |
| 2011/0040483 | A1* | 2/2011 | Marshall ............... G01W 1/16 702/4 |
| 2012/0154971 | A1* | 6/2012 | Brashear ............... H02H 3/22 361/118 |
| 2014/0222510 | A1* | 8/2014 | Martin ............... G06Q 40/00 705/7.31 |
| 2014/0321243 | A1 | 10/2014 | Guignard et al. |

OTHER PUBLICATIONS

"Boltek StormTracker PCI," Nexstorm, Retrieved from the Internet URL: http://www.carterlake.org/lightningdetector.php, on Jan. 23, 2017, pp. 1-3.
"Vaisala Thunderstorm Total Lightning Sensor TLS200," Vaisala, Retrieved from the Internet URL: http://www.vaisala.com/en/products/thunderstormandlightningdetectionsystems/Pages/TLS200.aspx, on Jan. 23, 2017, pp. 1-4.
"4500-LSS Thunderstorm & Lightning Detector," MTECH Systems, Retrieved from the Inernet URL: http://www.mtechsystems.com/meteorological/lightning-sensors.html, on Jan. 23, 2017, p. 1.

* cited by examiner

*Primary Examiner* — Melissa J Koval
*Assistant Examiner* — Trung Nguyen
(74) *Attorney, Agent, or Firm* — Buckley, Maschoff & Talwalkar LLC

(57) ABSTRACT

Provided is a lighting system comprising at least one lightning detection site including a local controller. The lightning detection site comprises one or more sensors configured for detecting data associated with at least one from the group selected from sound, electromagnetic field, and ambient light flashes. The local controller is configured to analyze the detected data to determine probability that a lightning strike occurred.

14 Claims, 7 Drawing Sheets

FIG. 1
(Conventional)

METHOD AND SYSTEM FOR LIGHTNING DETECTION

FIELD OF THE INVENTION

The present invention relates generally to lighting systems. More particularly, the present invention relates to integrating special-purpose sensors with smart lighting systems to detect environmental conditions.

BACKGROUND OF THE INVENTION

Lightning is perhaps the most misunderstood, most unpredictable, and most dangerous meteorological phenomena. The average lightning bolt is over one million volts, over 30,000 amps, and is nearly 55,000 degrees Fahrenheit (hotter than the surface of the sun). This destructive power is responsible for over 10,000 deaths around the world (about 60 across the United States), annually. Additionally, lightning is responsible for roughly 60 percent of all wildfires. Although all thunderstorms produce lightning, lightning can actually occur without a thunderstorm. Given the destructive nature and unpredictability of lightning, accurately detecting lightning is even more critical.

Figure 1:
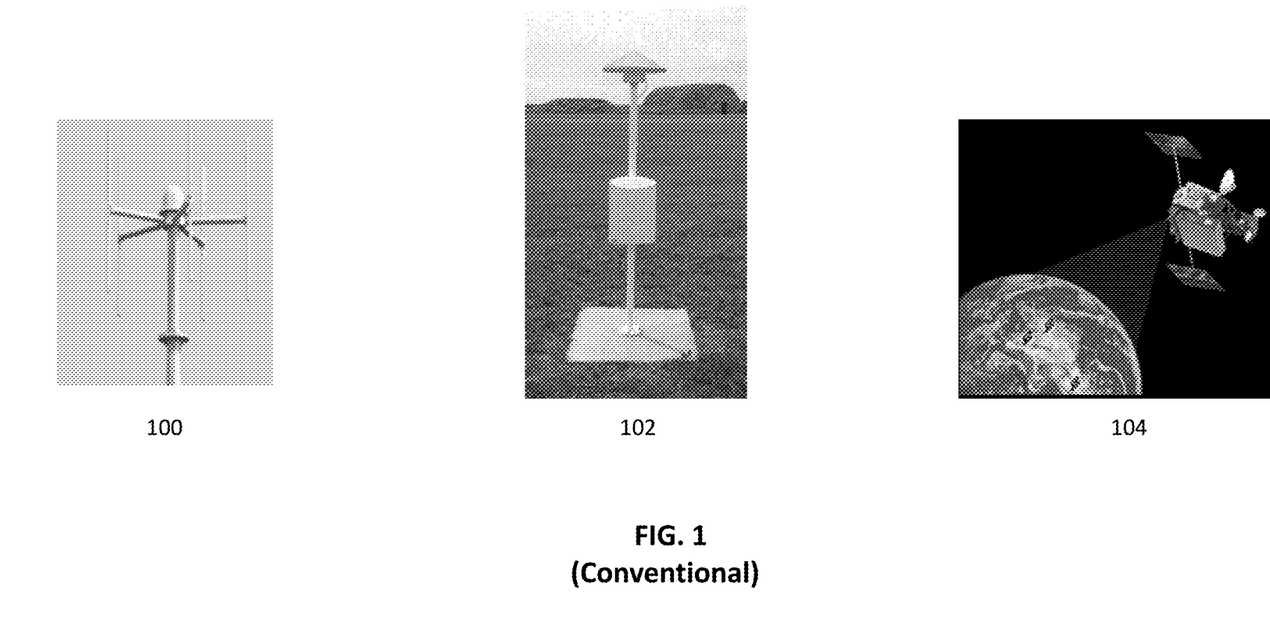
FIG. 1 is an illustration of the three primary types of conventional lightning detection systems.

Conventional lightning detection systems are fairly large and expensive and primarily capture the electromagnetic field signature of a lightning strike. These conventional systems fall into three categories: ground-based, mobile, and satellite-based. FIG. 1 is an illustration of the three primary types of conventional lightning detection systems. Because of the electromagnetic and electrostatic activity occurring during a thunderstorm, conventional detectors will have a ratio of successful detection much lower than 100%.

Ground-based systems, such as the Vaisala™ sensor 100 of FIG. 1, include a network of antennas to sense lightning flashes and radiofrequency (RF) energy. They triangulate data from multiple sensors to determine distance and location. Data from these systems is often correlated with weather radar data. The National Weather Service, for example, uses ground-based detection systems. Ground-based systems, however, are limited in the types of lightning they can accurately detect. They are also costly and not available to individual subscribers, or to the general public.

Single-point (e.g., mobile or portable) detection systems include a single omni-directional antenna and measure range and location (e.g., azimuth) based on signal frequency and attenuation. These systems can detect the approach of a lightning system, but don't do as well pinpointing location. They also suffer from high false alarm rates. Single-point systems, however, are less costly, and are available to individual sub scribers.

More advanced single-point systems, such as the Mtech™ system 102, are used to detect thunderstorms at airports and other areas where safety is a factor. These more advanced systems provide detection using long-range lightning sensors that allow monitoring of lightning strikes and thunderstorm cell development. The system 102, of FIG. 1, correlates the electric and magnetic signatures of lightning strikes to provide range and azimuth information.

Satellite-based detection systems, such as the system 104, include a network of satellites to detect data related to location, time, and amplitude of lightning strikes with high levels of accuracy. Satellite-based systems, however, are also not available to individual subscribers. Additionally, the time delay created by the distance of the network to the lightning strike can make satellite-based lightning detection systems impractical for detecting lightning strikes in real-time.

SUMMARY OF EMBODIMENTS OF THE INVENTION

Given the aforementioned deficiencies, a need exists for improved lightning detection systems that are smaller, less costly, and more accurately detect lightning strikes. Additionally, a need exists for systems that are more accessible to individual sub scribers.

Embodiments of the present invention provide small, low cost modules, integrated with smart lighting fixtures. The modules increase successful detection and can accurately map lightning strikes by averaging the response of an network of sensors. In these systems, distance can be determined using local analytics that correlate operational data captured by the sensors. The captured data include electromagnetic, acoustic, and temperature aspects of lightning, along with global positioning satellite (GPS) time stamps.

Under certain circumstances, embodiments of the present invention include a lighting system comprising at least one lightning detection site including a local controller. The lightning detection site comprises one or more sensors configured for detecting data associated with at least one from the group selected from sound, electromagnetic field, and ambient light flashes. The local controller is configured to analyze the detected data to determine probability that a lightning strike occurred.

Illustrious embodiments of the present invention provide an ability to more efficiently track lightning strikes. This increased efficiency enables production of high quality data related to lightning strikes, and more importantly, the design of detection systems that provide even earlier warnings. More accurate mapping of lightning strikes, provided by the embodiments, yields tools that facilitate more accurate prediction of lightning strikes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention add a low cost lighting detection module in a percentage of smart luminaires deployed in locations of interest, as part of a standard environmental sensor pack. The environmental sensor pack includes, for example, microphones, electromagnetic sensors, and an optional camera, as explained in greater detail below. This deployment provides high density sensor fusion, with the microphones, and cameras. One advantage of such a system is increased detection accuracy due, at least in-part, to an ability to triangulate the lightning strike's azimuth.

Additionally, detection systems, in accordance with the embodiments, provide lightning related data in a single location, and distribute information, derived from the data, across a number of other locations within system. This system enables detection devices to create more granular depictions of lightning strikes. For example, lightning information can be averaged from nearby stations, enhancing determination of the lightning strike's distance.

By way of example only, and not limitation, a preferred embodiment includes luminaires deployed on light poles deployed across a metropolitan area, airports, or similar areas, of interest to consumers. In such an arrangement, a lightning detection device can be included in every second, third, or fourth lighting pole, providing a predetermined between sensor modules. This spaced apart arrangement provides more detailed information about how the lightning evolves. Lightning detection systems, according to the embodiments, leverage the use of existing infrastructure, such as a light poles, and applied power. Use of this existing infrastructure reduces costs.

Figure 2:
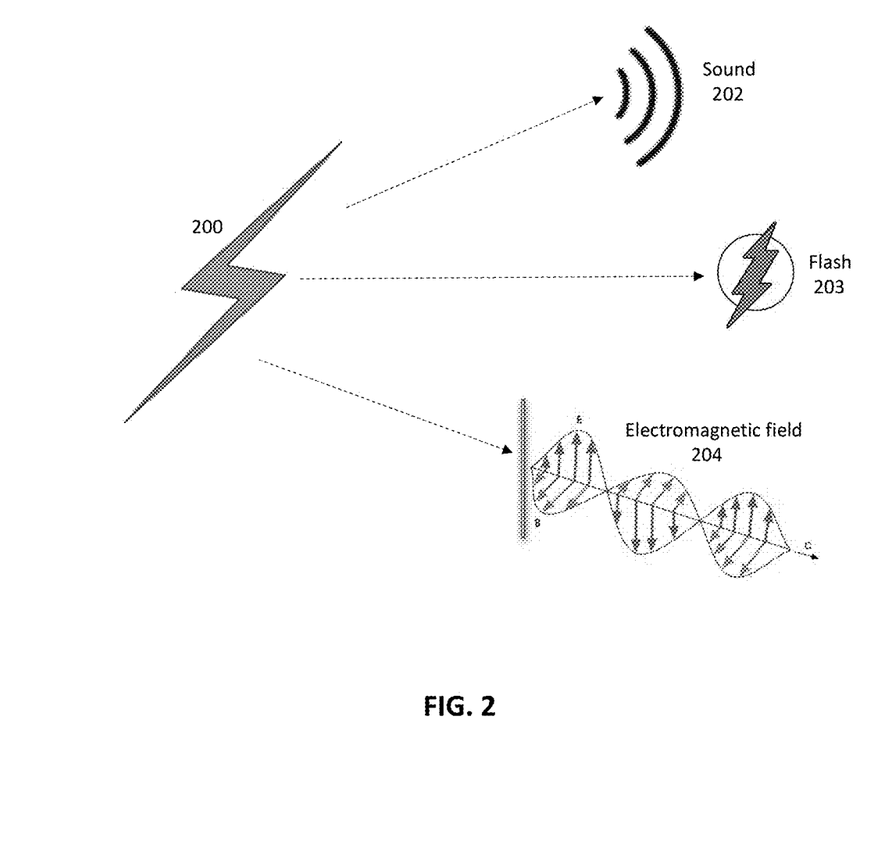
FIG. 2 is an illustration of exemplary lightning characteristics detectable in accordance with embodiments of the present invention.

FIG. 2 is an illustration of example lightning components detectable in accordance with embodiments of the present invention. In FIG. 2, a lightning strike 200 produces a sound component 202 (e.g., thunder), a visible lightning flash 203, and an electromagnetic field 204. The electromagnetic field is propagating in a direction c and includes an electric component (E), and a magnetic component (B).

The embodiments offer several advantages over conventional systems including lower deployment costs, increased detection accuracy, and higher resolution strike mapping. Other advantages include sensor fusion with microphones, and cameras for damage assessment and flash detection. Also included is more precise time stamps resulting from use of GPS clocks. For example, the highly precise GPS clocks can be used to reduce jitter, between nodes, to less than 50 microseconds (µs). Reducing this jitter ultimately enhances determining location of the lightning strike 200.

Figure 3A:
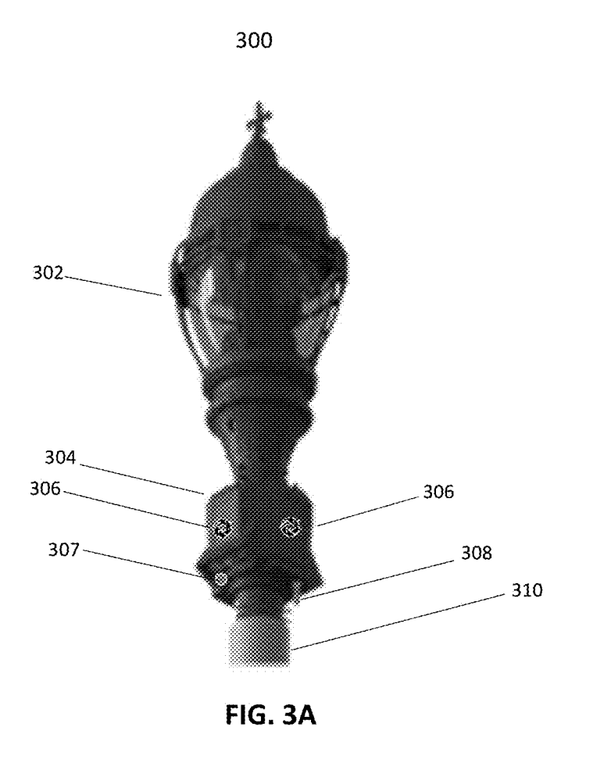
FIG. 3A is an illustration of an exemplary lighting device, such as a smart luminaire, constructed in accordance with the embodiments.

FIG. 3A is an illustration of an exemplary lighting device 300, such as a smart luminaire, constructed in accordance with the embodiments. The lighting device 300 includes a light source 302, such as light emitting diodes (LEDs). A compartment 304 houses a wireless control system, or node 305, illustrated in FIG. 3B.

Figure 3B:
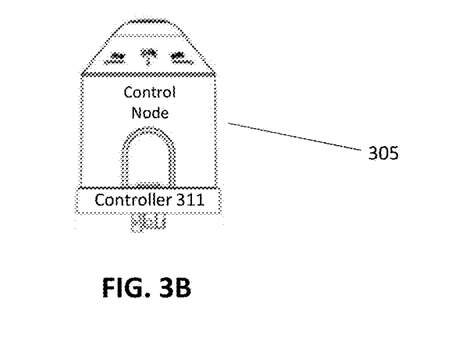
FIG. 3B is an illustration of a control node used within the lighting device depicted in FIG. 3A.

The node 305 can include two or more optional cameras 306 and microphones 307. The lighting device 300 also includes an electromagnetic field detector 308. In other embodiments, the cameras 306 and microphones 307 can be located within a light post 310, or affixed thereto. The node 305 includes a computer controller 311, comprising one or more microprocessors.

Embodiments of the present invention require sufficient processing capability to perform real-time correlation and analysis of high density audio, video, and electromagnetic data samples. Although off the shelf microprocessor chipsets can be used within the node 305, specially programmed central processing units (CPUs) and graphics processing units (GPU's) may offer considerable advantages for input/output (I/O) and custom video optimization.

The node 305 includes microprocessors that, among other things, facilitate remote monitoring and control of components such as the LEDs, the cameras 306, and the microphones 307.

The node 305 also includes a GPS device (not shown) to perform mapping of streetlights, and provide times-tamping.

The cameras 306 can be configured to detect occurrence and orientation of the lightning flash 200. The microphone 307 detects the sound 202, of an acoustic signature associated with the lightning strike 200. Similarly, the electromagnetic field detector 308 senses presence of the electromagnetic field 204, associated with the lightning strike 200. Although a preferred embodiment detects lightning based only upon correlations of the sound 202 and the electromagnetic field 204, other embodiments include correlation and analysis of flash data 203, captured by the cameras 306.

In these other illustrious embodiments, the cameras 306 can have dual applications. In one application, the cameras 306 can be oriented in a manner to detect the flash 203. Data associated with the detected flash can be directly correlated with sound 202 and the electromagnetic field 204 to detect the lightning strike 200.

In the embodiments, the cameras 306 can be oriented in a manner such that correlated flash data 203 can be used to resolve uncertainty or ambiguities related to detection of the lightning 200. These ambiguities could result from analysis of the sound 202 and the electromagnetic field 204. By way of example, the cameras 306 could be oriented to look in different directions.

Figure 4:
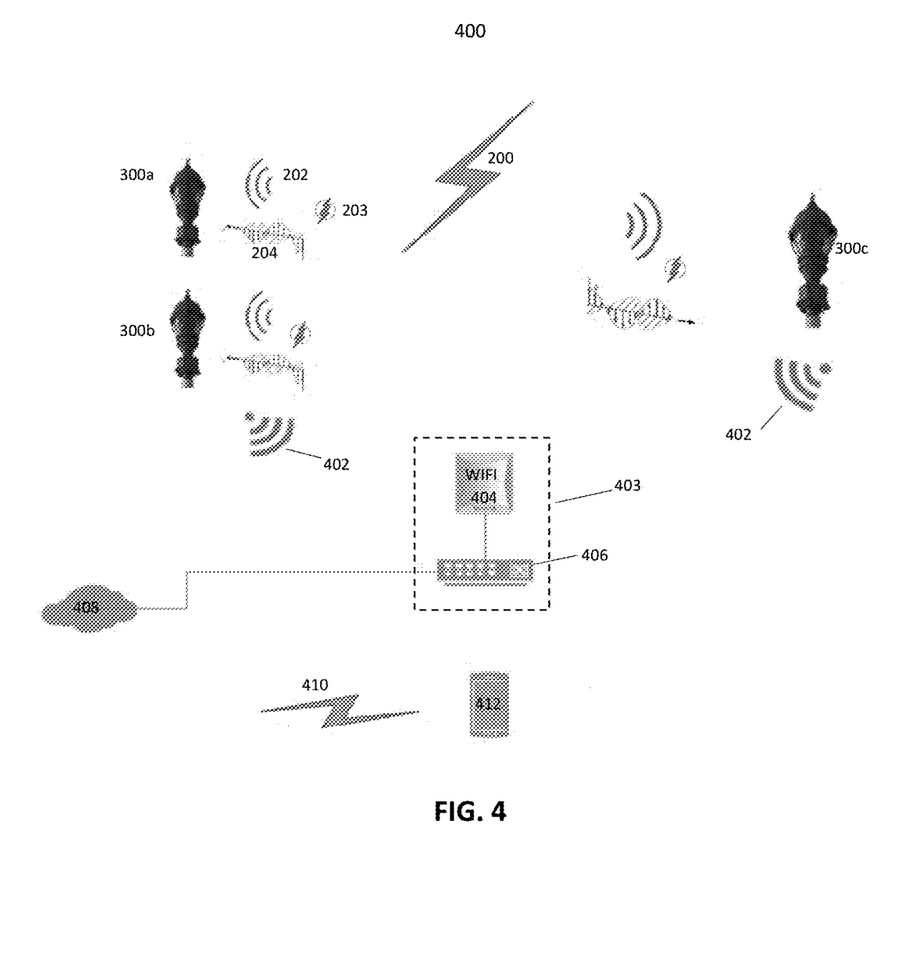
FIG. 4 is an illustration of an exemplary lightning detection system constructed in accordance with the embodiments.

FIG. 4 is an illustration of an exemplary lightning detection system 400 constructed in accordance with the embodiments. The exemplary lighting system 400 includes three lighting devices 300a-300c (i.e., detection sites) configured in a networked arrangement. Each of the detection sites 300a-300c performs its own detection of the sound 202 and the electromagnetic field 204, via the microphone 307 and the field detector 308. In another embodiment, each of the detection sites 300a-300c also captures the flash 203 via at least one of the respective cameras 306.

Although FIG. 4 show three detection sites 300a-300c, deployment of 30 or more detection sites 300 provide for more precise statistical analysis of the collected data. For example, data correlation is performed using standard deviation analyses. As understood by those of skill in the art, standard deviation analysis, as a rule of thumb, produces more reliable results when using 30 or more sample sets. In the embodiments, analysis of higher numbers of sample sets produce better lightning detection results.

In the exemplary lightning detection system 400, data correlation and analysis is performed in two tiers. For example, data collected by the cameras 306, the microphone 307, and the field detector 308 is initially correlated locally, within respective nodes 305. This local processing correlates and analyzes all of the data points from the respective sensors to authenticate whether the operational data samples are representative of a lightning strike, such as the lightning strike 200.

The node 305 includes specially programmed microprocessors configured to correlate data points associated with the sound 202, the flash 203, and the electromagnetic field 204. For example, software architecture configured to execute on the microprocessors within the node 305 is logically organized to enrich data detected by the hardware components. This hardware includes the microphone 307, the field detector 308, the cameras 306, the GPS device and temperature sensors within the node 305.

In the embodiments, the node 305 applies local analytical techniques on operational data collected from the microphone 307, the electromagnetic detector 308, the temperature sensor, and timestamp data from the GPS device. This local analysis can also include processing of video feed feeds from the cameras 306 associated with the detection sites 300a-300c.

This local analysis correlates sound 202, electromagnetics 204, GPS timestamps, and optionally flash data 203 to preliminarily determine lightning strikes. The results of this local analysis can be applicable to real-time usage. Alternatively, this analysis might be applicable to historical use cases. Although advanced analysis will be performed via cloud-based applications for validation, tracking, and prediction of lightning detection. Only a small percentage of locally collected operational data is usable for the advanced cloud-based analysis. Any unused data is stored.

The advanced cloud based analysis can be more of a batch analysis than a real-time analysis. Transmitting massive amounts of usable batch data can unnecessarily consume bandwidth and create system latencies. Additionally, users are typically charged based on the volume of information transmitted to the cloud. In the embodiments, performing local analytics may be a better value proposition (cheaper and more efficient)—permitting the user to transmit, and pay for, a smaller percentage of more highly relevant information. Additionally, this process can also help avoid or reduce potential latency issues.

Accordingly, analytical techniques, such as edge analysis, are performed at the node 305 to determine if the data is of value. The analysis commences when the operational data is created. Any unused data is stored locally. Metadata is derived from the local analysis. This metadata, representative of the valuable information and inputs, is transmitted to a cloud for application of more advanced cloud-based analytics. For example, the metadata might show that a particular set of locally correlated data points most likely represent a lightning strike. The metadata might take the form of the following: ID(lightning)*timestamp(abc)*pole-location(n)*GPS coordinates(xyz).

The metadata is transmitted via links 402 to a communications module 403. The communications module 403 includes a transceiver module 404 coupled to a field register device 406 for aggregating data from the multiple detection sites 300a-300c. Although the transceiver module 404 is depicted as a Wi-Fi link, the embodiments are not so limited. For example, the transceiver module 404 could use cellular, RF, fiber optic, or microwave communication links etc.

Considering that a potential usage scenario may include video data streaming, the communications system 403 is desirably high bandwidth. Thus, once the local analysis determines a set of data points was most likely lightning, the corresponding metadata is transmitted to a cloud 408 via the communications system 403. Before the metadata is transmitted to the cloud 408, the local processing will be discussed in greater detail with reference to FIG. 5.

Figure 5:
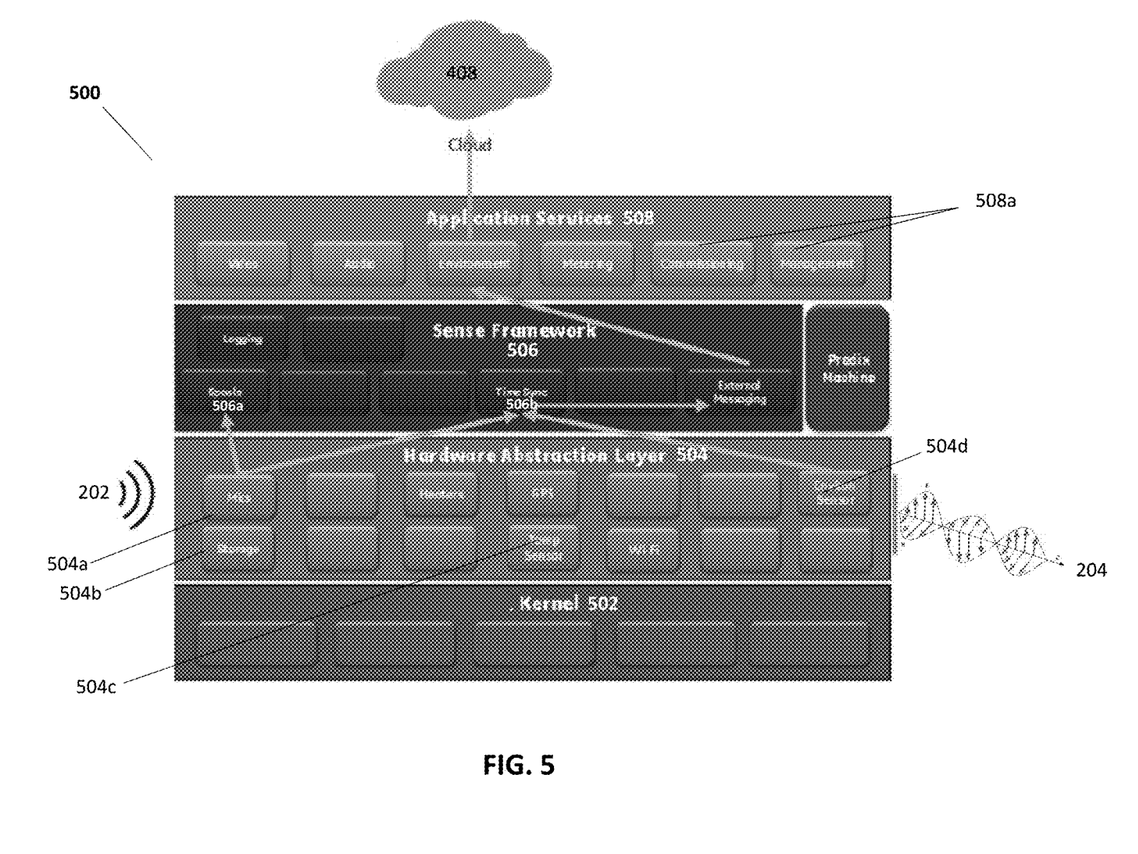
FIG. 5 is an illustration of an exemplary logical layering of microprocessor software architecture in accordance with the embodiments.

FIG. 5 is an illustration of an exemplary logical layering 500 of microprocessor software architecture structured in accordance with the embodiments. The logical layering 500 provides a general framework with which the controller 311 executes its internal processes to perform the local analytics, discussed above. By way of example, the logical layering 500 can includes functions 508a such as commissioning and management The foundation of the logical layering 500 is a kernel layer 502. The kernel layer 502 includes drivers, hard disk(s), and all of the services needed by the operating system (OS). The logical layering 500 also includes a hardware abstraction layer 504 configured for formatting information, such as the sound 202 and the electromagnetic field 204, captured by corresponding hardware components.

As understood by those of skill in the art, a hardware abstraction layer 504 is a logical partitioning of code representing an abstraction layer between hardware components and the OS. More particularly, the hardware abstraction layer provides a device driver interface allowing the OS to communicate with the hardware components.

The hardware devices correspond to abstraction modules 504a-504d. The abstraction of the hardware components can enrich the local analysis (i.e., within the node 305). This enriched local analysis ultimately reduces triggering of false alarms and lightning detection ambiguities.

More specifically, the hardware abstraction layer 504 includes several abstractions of hardware components of interest. In the instant embodiments, the hardware components include the microphone 307, the field detector 308, the cameras 306, the GPS transponder, temperature sensors etc. within the node 305. Each of these hardware components has a corresponding abstraction block 504a-504d within the abstraction layer 504. Each of the abstraction blocks 504a-504d is a driver representing a standardization of characteristics associated with its corresponding hardware component.

That is, each of the abstraction blocks 504a-504d is configured to interpret information from its corresponding hardware component (e.g., temp sensor, microphone etc.). Thus, when actual temperature or sound is detected, the respective abstraction block 504a-504d accurately interprets this information and properly formats it for further use within the logical layering 500. This process eliminates potential inaccuracies created, for example, when replacing a faulty hardware component with a different plug-and-play variation. Information from the hardware abstraction layer 504 is supplied to a sense framework layer 506.

The sense framework layer 506 defines logical groupings of data produced by the hardware abstraction layer 504. Within the sense framework layer 506, services that are dependent upon commonly used data, output from the hardware abstraction layer 504, are defined. That is, the sense framework layer 506 resolves the issue of how data from all of the hardware components can be assessed to find common denominators. By associating this common data with specific services, information can be optimally used to support the local analysis.

In FIG. 5, for example, data output from the Mics module 504a, within the hardware extraction layer 504, is needed for performing spooling 506a and time synchronization 506b, within the sense framework layer 506.

As noted above, selected portions of data, not used during the local analysis, can be spooled to storage for later retrieval and usage within the cloud 408. By way of example, historical temperatures associated with different lightning strikes could be assembled. In another example, a history of sounds produced by different lightning strikes, in a particular geographic region, could be retrieved and used for real-time analysis. Alternatively, a history of video feeds from the cameras 306 could be instructive in determining whether lightning has previously struck one particular house, or the other.

An application services layer 508 is provided for execution of the local edges analysis program. Execution of this program leverages the capability of the earlier layers, within the framework 500, to determine whether the collected operational data is of value. Responsive to this determination, a decision is made whether to produce metadata for connection and transmission to the cloud 408.

Returning to FIG. 4, the cloud-based advanced analysis can correlate the metadata, collected from the detection sites 300a-300c, for lightning strike tracking and prediction, using standard prediction techniques known in the art. By way of example, when uncertainties or ambiguities occur during application of the advanced analysis, the cloud-based applications can access and process portions of the unused, locally stored or spooled, operational data.

The applications within the cloud 408 determine, for example, whether a significant number of detection sites identified a particular set of correlated data samples as a lightning strike. Data from only one detection might indicate that the correlated data samples were the result of an automobile backfiring, instead of a lightning strike. On the other hand, if a significant number of detection sites identified the correlated data as a lightning strike, then the earlier determination of lightning will be confirmed.

In the embodiments, once the cloud based advanced analysis confirms a lightning strike occurred, additional data samples may be correlated to determine whether the metadata defines a particular geographic area. If so, based on the historical data, a warning could be sent indicating that when thunderstorms occur within the geographic area, 90% of the time severe lightning also occurs. Therefore, given the high occurrence of lightning, long-term deployment of lightning protection devices, such as lightning rods, made be necessary.

In another embodiment, the lightning detection system 400 can be configured to detect lightning predictors, such as step leaders, streamers, and corona effect etc. For example, the sensors or hardware components, may be oriented to detect electrification of specific geographic areas. In these, and other ways, embodiments of the present invention can be used to track and predict lightning strikes using tracking and prediction techniques well known to those of skill in the art.

After advanced analysis within the cloud 408, lightning prediction information can be transmitted, via a cellular link 410, to an individual user one a smart device 412, such as a cell phone, computer tablet, or the like.

Figure 6:
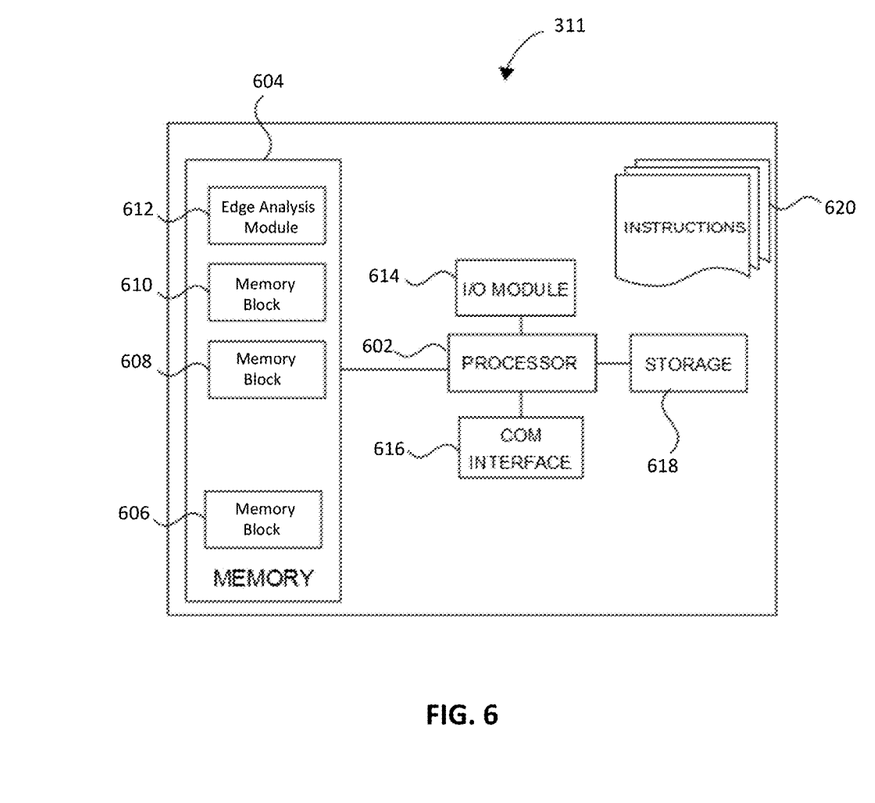
FIG. 6 is a block diagram illustration of a special-purpose computer on which embodiments of the present invention can be implemented.

FIG. 6 is a block diagram illustration of a special-purpose controller 311 on which embodiments of the present invention can be implemented. Having set forth various exemplary embodiments, a controller 311 (or system) consistent with their operation is now described. FIG. 6 shows a block diagram of the controller 311, which can include one or more processors 602 that have a specific structure.

The specific structure can be imparted to processor 602 by instructions stored in a memory 604 included therein and/or by instructions 620 that can be fetched by processor 612 from a storage medium 618. The storage medium 618 may be co-located with the controller 311 as shown, or it may be located elsewhere and be communicatively coupled to controller 311.

The controller 311 can be a stand-alone programmable system, or it can be a programmable module located in a much larger system. For example, controller 311 can be part of the lightning detection system 400. The controller 311 may include one or more hardware and/or software components configured to fetch, decode, execute, store, analyze, distribute, evaluate, and/or categorize information. Furthermore, the controller 311 can include an I/O module 614 that can be configured to interface with two or more optional cameras 306, microphones 307, temperature sensors, the GPS device, and the electromagnetic field detector 308.

The processor 602 may include one or more processing devices or cores (not shown), such as a CPU and a GPU. In some embodiments, the processor 602 may be a plurality of processors, each having either one or more cores. The processor 602 can be configured to execute instructions fetched from the memory 604, i.e. from one of memory blocks 612, 610, 608, or memory block 606, or the instructions may be fetched from the storage medium 618, or from a remote device connected to the controller 311 via a communication interface 616.

Furthermore, without loss of generality, the storage medium 618 and/or memory 604 may include a volatile or non-volatile, magnetic, semiconductor, tape, optical, removable, non-removable, read-only, random-access, or any type of non-transitory computer-readable computer medium. The storage medium 618 and/or the memory 604 may include programs and/or other information that may be used by the processor 602. Furthermore, the storage medium 618 may be configured to log data processed, recorded, or collected during the operation of controller 600. The data may be time-stamped, location-stamped, cataloged, indexed, or organized in a variety of ways consistent with data storage practice.

In one embodiment, for example, the memory block 606 may include instructions that, when executed by the processor 602, cause processor 602 to perform certain operations. The embodiments, the controller 311 performs local analytical techniques, such as edge analysis, on data from the microphone 307, the electromagnetic detector 308, the temperature sensor, and timestamp data, from the GPS device and video feed feeds from the cameras 306.

Figure 7:
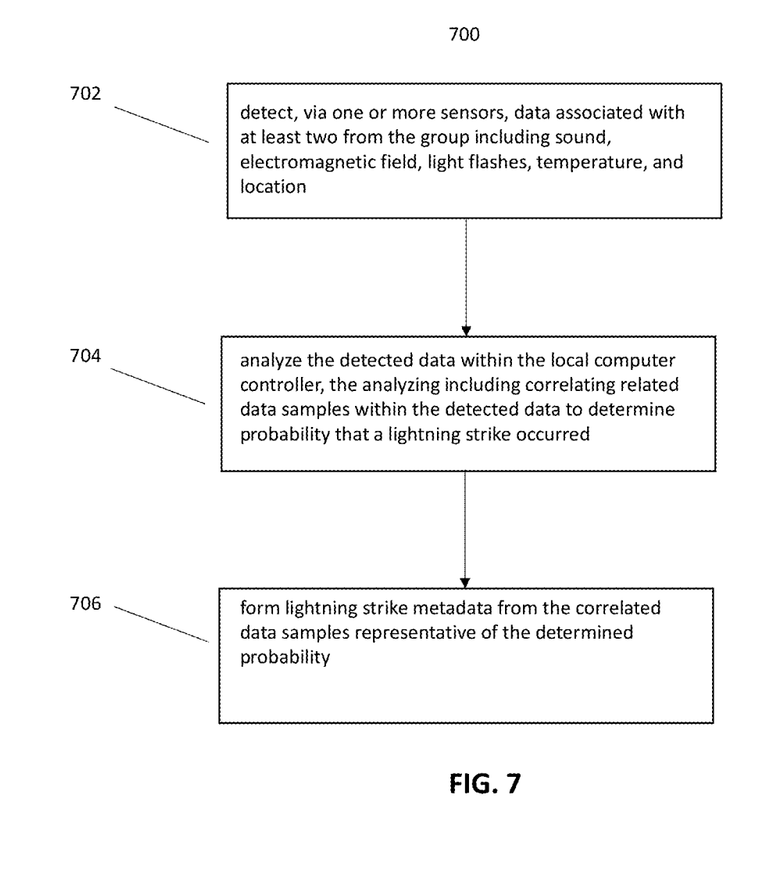
FIG. 7 is a flowchart of an exemplary method of practicing an embodiment of the present invention.

FIG. 7 is a flowchart of an exemplary method 700 of practicing an embodiment of the present invention. In the method 700, data associated with at least two from the group including sound, electromagnetic field, light flashes, temperature, and location are detected via one or more sensors, at block 702. In block 704, the detected data is analyzed within the local computer controller, the analyzing including correlating related data samples within the detected data to determine probability that a lightning strike occurred. Lightning strike metadata is formed in the correlated data samples representative of the determine probability, as depicted in block 706.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A lighting system comprising more than one lightning detection site, each lightning detection site comprising a light source and a node, said node including:
   a local controller, sensors configured for detecting an electromagnetic field and additionally at least one of sound and ambient light flashes;
   wherein the local controller is configured to, in response to the detecting, automatically analyze data associated with the detected electromagnetic field and the at least one of sound and ambient light flashes to correlate the data associated with the detected electromagnetic field and the at least one of the sound and the ambient light flashes to determine a probability that a lightning strike occurred and further configured to produce metadata at the local controller representative of the determined probability and the data.

2. The lighting system of claim 1, further comprising a remote controller configured to analyze the metadata.

3. The lighting system of claim 2, wherein the remote controller is cloud-based.

4. The lighting system of claim 2, wherein the remote controller is configured to (i) receive the aggregated metadata and (ii) track the lightning strike in accordance with the received aggregated metadata.

5. The lighting system of claim 1, further comprising a communications module configured to receive the metadata transmitted from the at least one detection site, the communications module (i) aggregating the received metadata and (ii) transmitting the aggregated metadata to a remote controller configured to analyze the metadata.

6. The lighting system of claim 1, wherein the sensors include at least an electromagnetic field detector and further include at least one of a microphone, an environmental sensor, a camera, a temperature sensor, and a global positioning system (GPS) device.

7. The lighting system of claim 1, wherein the local controller performs edge analysis on the detected electromagnetic field and the at least one of sound and ambient light flashes before determining the probability of the lightning strike.

8. The lighting system of claim 7, wherein determining the probability of the lightning strike is based upon edge analysis.

9. A lighting system comprising more than one lightning detection site, each lightning detection site comprising a light source and a node, said node including:
   a local controller;
   sensors configured for detecting an electromagnetic field and additionally at least one of sound and ambient light flashes;
   wherein the local controller is configured to analyze data associated with the detected electromagnetic field and the at least one of sound and ambient light flashes to correlate the data associated with the detected electromagnetic field and the at least one of the sound and the ambient light flashes to determine a probability that a lightning strike occurred.

10. The lighting system of claim 9, wherein the local controller is further configured to produce metadata at the local controller representative of the determined probability and the data.

11. The lighting system of claim 9, further comprising a cloud-based remote controller configured to analyze the metadata.

12. The lighting system of claim 11, wherein the remote controller is configured to (i) receive the aggregated metadata and (ii) track the lightning strike in accordance with the received aggregated metadata.

13. The lighting system of claim 9, further comprising a communications module configured to receive the metadata transmitted from the at least one detection site, the communication module (i) aggregating the received metadata and (ii) transmitting the aggregated metadata to a remote controller configured to analyze the metadata.

14. The lighting system of claim 9, wherein the sensors include at least an electromagnetic field detector and further include at least one from selected from a microphone, an environment sensor, a camera, a temperature sensor, and a global positioning system (GPS) device.

* * * * *

UNITED STATES PATENT AND TRADEMARK OFFICE
CERTIFICATE OF CORRECTION

| | | |
|---|---|---|
| PATENT NO. | : 10,627,546 B2 | Page 1 of 1 |
| APPLICATION NO. | : 15/368712 | |
| DATED | : April 21, 2020 | |
| INVENTOR(S) | : Sebastien Magnan | |

It is certified that error appears in the above-identified patent and that said Letters Patent is hereby corrected as shown below:

In the Claims

Column 10, Line 47:
"11. The lighting system of claim 9, further comprising a" should read, --11. The lighting system of claim 10, further comprising a--.

Column 10, Line 54:
"13. The lighting system of claim 9, further comprising a" should read, --13. The lighting system of claim 10, further comprising a--.

Column 10, Line 62:
In Claim 14, Line 3, "include at least one from selected from a microphone, an" should read, --include at least one sensor selected from a microphone, an--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*